(12) United States Patent
Zatta

(10) Patent No.: US 9,823,489 B2
(45) Date of Patent: Nov. 21, 2017

(54) SPECTACLES-FRAME HINGE

(71) Applicant: MATRIX S.r.l., Seren del Grappa (IT)

(72) Inventor: Alessandro Zatta, Seren del Grappa (IT)

(73) Assignee: MATRIX S.R.L., Seren del Grappa (IT)

( * ) Notice: Subject to any disclaimer, the term of this patent is extended or adjusted under 35 U.S.C. 154(b) by 0 days.

(21) Appl. No.: 14/781,788

(22) PCT Filed: Apr. 11, 2014

(86) PCT No.: PCT/IB2014/060654
§ 371 (c)(1),
(2) Date: Oct. 1, 2015

(87) PCT Pub. No.: WO2014/167541
PCT Pub. Date: Oct. 16, 2014

(65) Prior Publication Data
US 2016/0041405 A1     Feb. 11, 2016

(30) Foreign Application Priority Data

Apr. 11, 2013  (IT) .............................. TV2013A0051

(51) Int. Cl.
*G02C 5/22*  (2006.01)
*G02C 5/14*  (2006.01)

(52) U.S. Cl.
CPC .......... *G02C 5/2209* (2013.01); *G02C 5/146* (2013.01); *G02C 5/22* (2013.01); *G02C 5/2227* (2013.01);
(Continued)

(58) Field of Classification Search
CPC ........ G02C 5/2209; G02C 5/146; G02C 5/14; G02C 5/2227; G02C 5/2236; G02C 2200/06; G02C 2200/26
(Continued)

(56) References Cited

U.S. PATENT DOCUMENTS

| | | | | |
|---|---|---|---|---|
| 4,299,241 A | * | 11/1981 | Seiller Pierre F. X. | F16C 11/04 132/279 |
| 4,570,289 A | * | 2/1986 | Consolati ............. | G02C 5/2227 16/228 |

(Continued)

FOREIGN PATENT DOCUMENTS

| | | |
|---|---|---|
| EP | 0 889 347 | 1/1999 |
| EP | 0 992 831 | 4/2000 |

(Continued)

*Primary Examiner* — William R Alexander
(74) *Attorney, Agent, or Firm* — Leason Ellis LLP

(57) ABSTRACT

Connection hinge for spectacles frames of the type adapted to connect the lateral sidearm of a spectacles frame to the front part of the same spectacles frame; the connection hinge being characterized by comprising: a cup-shaped body, which is structured so as to be fixed cantilevered in a rigid manner onto the lateral side of the front part of a spectacles frame, and is provided with a central cavity of substantially cylindrical shape and with a transversal, oblong, pass-through slot or cut, which extends along the lateral side of the cup-shaped body while remaining on a lying plane locally substantially perpendicular to the reference axis of the central cavity, and penetrates in the cup-shaped body up to said central recess; a central pin which has a cylindrical shape substantially complementary to that of the central cavity of the cup-shaped body, and is inserted in axially rotatable manner in the central cavity of the cup-shaped body; and a transverse locking plug which has an end rigidly fixed to the body of the central pin, and is structured so as to protrude cantilevered from the cup-shaped body engaging (Continued)

in pass-through and sliding manner the pass-through slot or cut present on the lateral side of the cup-shaped body, and to be rigidly fixed or incorporated on the proximal end of the lateral sidearm of the spectacles.

15 Claims, 3 Drawing Sheets

(52) U.S. Cl.
CPC ....... *G02C 5/2236* (2013.01); *G02C 2200/06* (2013.01); *G02C 2200/26* (2013.01)

(58) Field of Classification Search
USPC .......................... 351/111, 113, 115, 119, 121
See application file for complete search history.

(56) References Cited

U.S. PATENT DOCUMENTS

| | | | |
|---|---|---|---|
| 5,115,540 A * | 5/1992 | Delorme | G02C 5/2209 16/228 |
| 5,589,895 A | 12/1996 | Mizuno | |
| 5,739,891 A * | 4/1998 | Wei | G02C 5/2209 16/228 |
| 5,815,899 A * | 10/1998 | Chao | G02C 5/008 16/228 |
| 5,975,693 A | 11/1999 | Malfroy et al. | |
| 6,241,354 B1 * | 6/2001 | Schuchard | G02C 5/2236 16/228 |
| 7,886,405 B2 * | 2/2011 | Cescon | F16C 11/0604 16/224 |
| 2002/0124350 A1 * | 9/2002 | Desbiez-Piat | G02C 5/008 16/228 |
| 2004/0020010 A1 * | 2/2004 | Wagner | G02C 5/2236 16/277 |
| 2004/0207806 A1 * | 10/2004 | Kerjean | G02C 5/2236 351/153 |
| 2004/0223115 A1 * | 11/2004 | Zancolo | G02C 5/2254 351/153 |
| 2011/0185538 A1 * | 8/2011 | Hotellier | G02C 5/008 16/228 |
| 2013/0000077 A1 | 1/2013 | Thompson | |

FOREIGN PATENT DOCUMENTS

| | | |
|---|---|---|
| EP | 1 469 338 | 10/2004 |
| WO | WO 2004/074906 | 9/2004 |

* cited by examiner

SPECTACLES-FRAME HINGE

CROSS REFERENCE TO RELATED APPLICATIONS

The present application is a U.S. National Phase of International Patent Application PCT/IB2014/060654 filed on Apr. 11, 2014, which claims priority to Italian Application No. TV2013A000051, filed on Apr. 11, 2013, each of which is incorporated by reference as if expressly set forth in their respective entireties herein.

TECHNICAL FIELD

The present invention relates to a spectacles frames hinge and to a spectacles frame provided with said hinge.

More in detail, the present invention relates to a spectacles or sunglasses frame hinge made of plastic and/or metal material, to which the following discussion will make explicit reference without loss of generality.

BACKGROUND ART

As known, spectacles are optical devices consisting of a pair of lenses made of transparent material, and of a support frame, traditionally called "spectacles frame", which is structured so as to stably hold the lenses, and to position the above mentioned lenses in front of the user eyes when the user wears the spectacles.

Normally, the spectacles frame is formed by a front part which is structured so as to support the two lenses, and is adapted to be arranged straddling the nose, at the height of the eyes; and by two lateral sidearms which protrude cantilevered from the front part of the spectacles frame, on opposite sides of the same, while remaining locally parallel and spaced apart and substantially perpendicular to the lying plane of the front part, so as to be able to rest on the ears of the person who wears the spectacles to give lateral stability to the front part.

More in detail, the proximal end of each lateral sidearm is usually fixed to the front part of the spectacles frame by a connection hinge of metal material, which allows the sidearm to rotate with respect to the front part about a reference axis that is locally substantially perpendicular to the longitudinal axis of the sidearm and also locally substantially parallel to the lying plane of the front part of the spectacles frame. The rotation axes of the two lateral sidearms are also substantially locally parallel and facing each other.

Each connection hinge, in particular, is composed of two anchoring elements in metal material, which are structured so as to be rigidly fixed one on the lateral side of the front part of the spectacles frame, and the other on the proximal end of the sidearm; and by a connection pin made of metal material, which is pass-through and axially rotatable within a series of pass-through holes especially made in the two anchoring elements, so as to allow the two anchoring elements to rotate one with respect to the other, about the longitudinal axis of the pin.

More in detail, in most of the spectacles-frame hinges currently on the market, the connection pin consists of a cylindrical shank screw, which has the shank end threaded so as to be screwed directly into the body of one of the two anchoring elements, and the remaining part of the shank perfectly smooth so as to allow the other anchoring element to rotate freely about the connection pin.

Although it is extremely simple and economical to produce, this type of spectacles hinge requires the user to periodically tighten the screw that serves as a connection pin, so as to ensure the correct long run operation of the hinge.

The rotation of the anchoring elements about the shank of the screw, in fact, tends to loosen the screw progressively up to cause the complete detachment of the shank from the corresponding anchoring element, with all the drawbacks that this entails on the functionality of the hinge.

DISCLOSURE OF INVENTION

Purpose of the present invention is therefore to provide spectacles-frame hinges that can obviate the above mentioned drawbacks, and which is also inexpensive to produce.

In accordance with said objectives, according to the present invention a spectacles-frame hinge as defined in claim 1 and preferably, but not necessarily, in any one of the dependent claims is provided.

According to the present invention a spectacles frame as defined in claim 15 is also obtained.

BRIEF DESCRIPTION OF THE DRAWINGS

The present invention will now be described with reference to the accompanying drawings, which illustrate a non-limiting embodiment, wherein:

FIGS. 3 and 4 are two perspective views of corresponding components of the connection hinge illustrated in FIG. 2; while

BEST MODE FOR CARRYING OUT THE INVENTION

Figure 1:
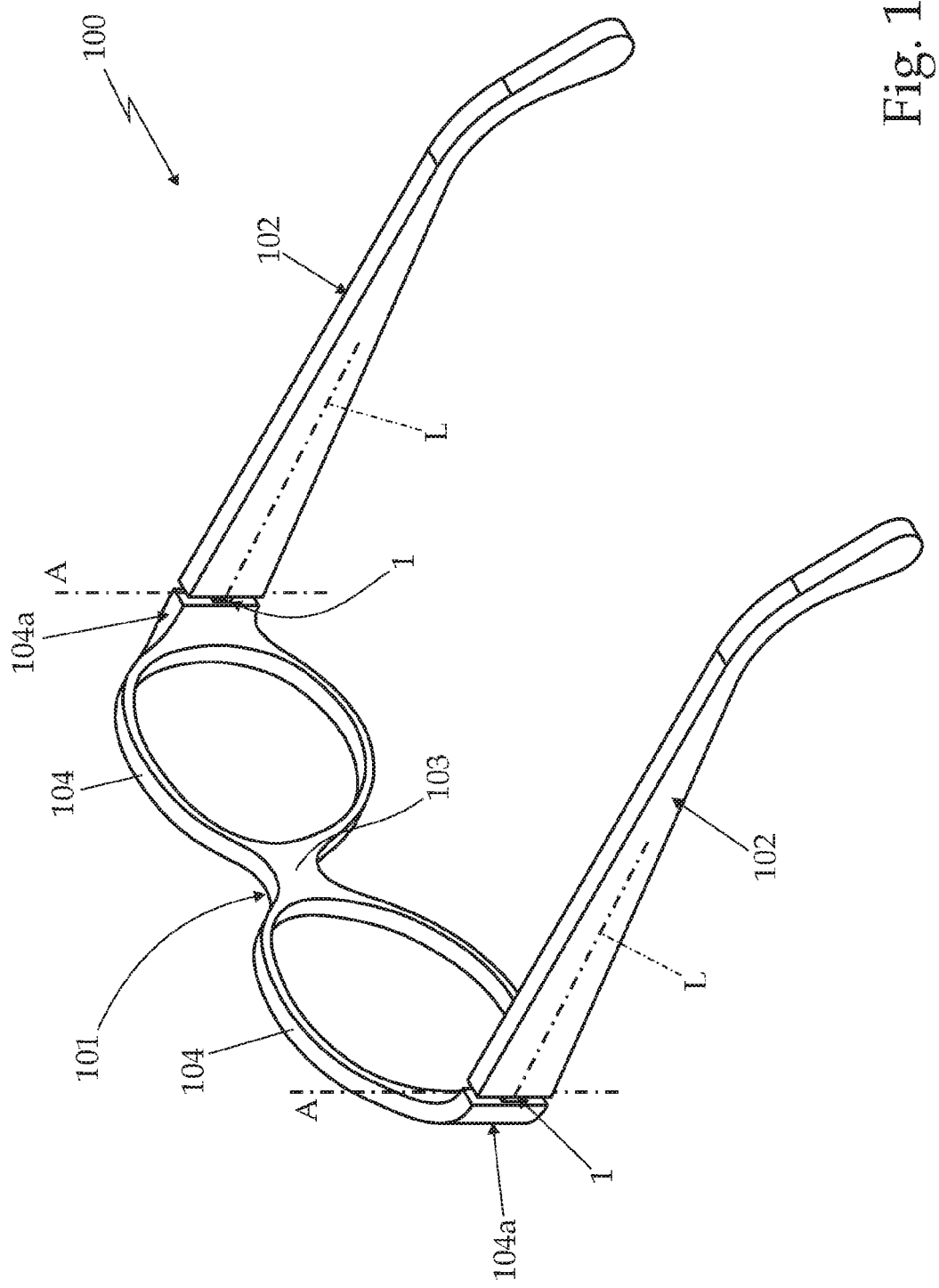
FIG. 1 is a perspective view of a spectacles frame provided with two connection hinges made according to the teachings of the present invention.
Figure 2:
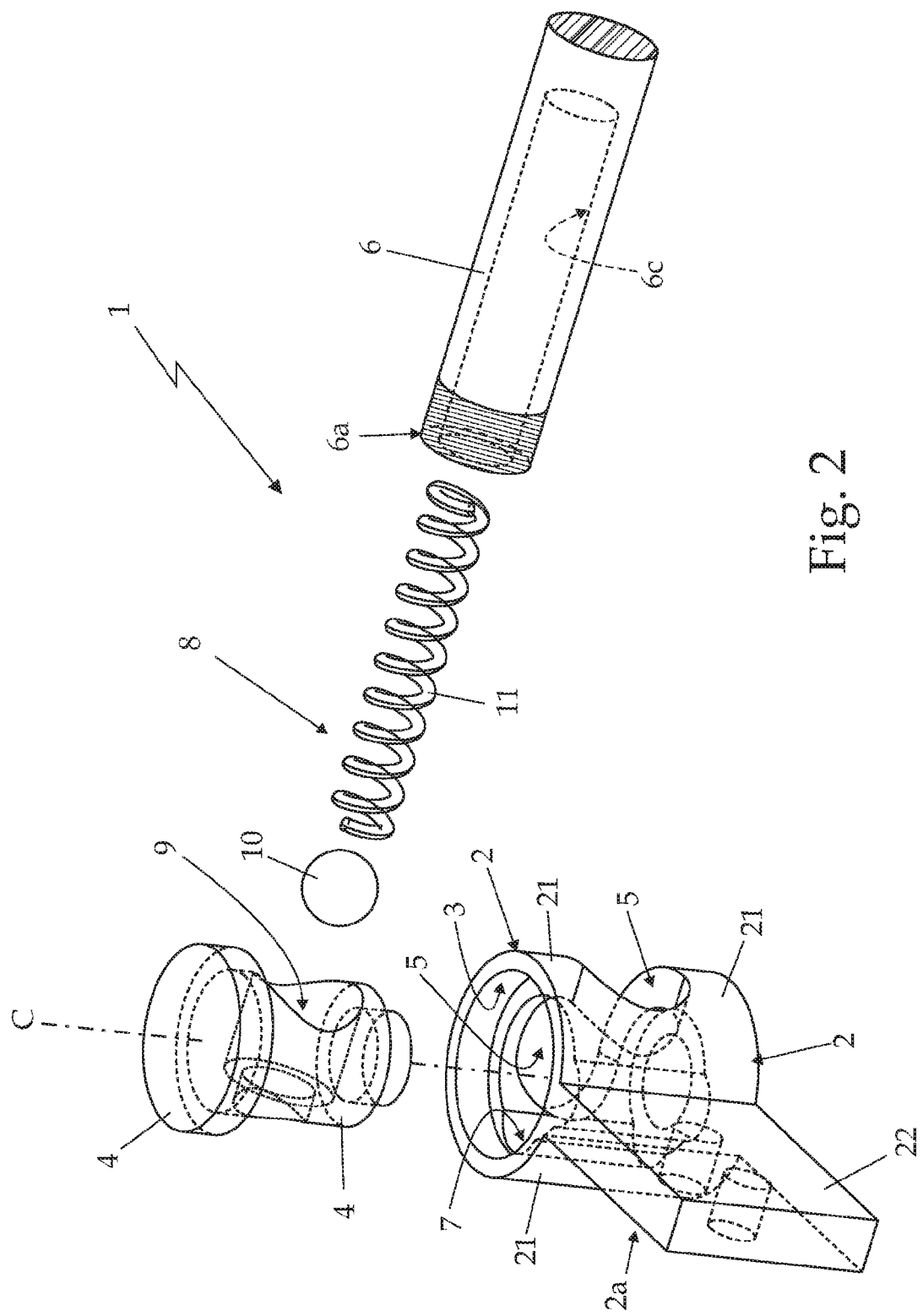
FIG. 2 is an exploded perspective view of one of the two hinges of the spectacles frame illustrated in FIG. 1.

With reference to FIGS. 1 and 2, number 1 indicates as a whole a connection hinge specifically structured to be able to connect the sidearm of a spectacles to the front part of the spectacles frame of the same spectacles.

The spectacles frame 100 of a spectacles, in fact, usually comprises a front portion 101 which is structured so to accommodate/support, side by side, a pair of corrective or shielded lenses of known type (not illustrated), and is adapted to be arranged straddling the nose, at the eye level, so as to place the two lenses one in front of each eye; and two lateral sidearms 102 which protrude cantilevered from the front part 101, on opposite sides of the same, while remaining substantially locally parallel and spaced apart and substantially perpendicular to the laying plane of the front part 101, so as to be arranged resting on the ears of the person that wears the spectacles frame 100 to provide lateral stability to the front part 101.

More in detail, the proximal end of each lateral sidearm 102 is fixed to the front part 101 of the spectacles frame by way of corresponding connection hinge 1 that is structured so as to enable the lateral sidearm 102 to rotate freely, with respect to the front part 101 of the spectacles frame, about a rotation axis A which is preferably locally substantially perpendicular to the longitudinal axis L of the sidearm, and locally substantially parallel to the lying plane of the front part of the frame 101. The two connection hinges 1 are also preferably oriented so that the rotation axes A of the two lateral sidearms 102 are locally substantially parallel to each other.

In other words, the proximal end of each lateral sidearm 102 is rigidly fixed to a lateral side of the front part 101 of the spectacles frame by way of respective connection hinge 1, so that each lateral sidearm 102 can freely rotate about the corresponding rotation axis A, between an upright position (see FIG. 1) wherein the lateral sidearm 102 extends cantilevered from the front side 101 of the spectacles frame while remaining locally substantially perpendicular to the lying plane of the front part 101 itself, and a folded position wherein the lateral sidearm 102 lies on the front side 101 of the spectacles frame, while remaining locally substantially parallel to the lying plane of the latter.

With reference to FIG. 1, in the example illustrated, in particular, the front part of the spectacles frame 101 is preferably formed by a central bridge or arch 103 which is structured so as to be arranged straddling the nose, resting on the same; and by two lateral lens holding rims 104 that are arranged on opposite sides of the bridge 103, so as to be aligned each to a respective user eye, are fixed at the two ends of the bridge 103 so as to form a rigid structure, and are finally structured so as to stably retain in their inside a respective corrective/protective lens (not shown) of the spectacles.

In the example illustrated, in particular, the bridge 103 and the two lens holding rims 104 are preferably made in a single piece of plastic material, preferably, but not necessarily, by an injection molding process.

With reference to FIGS. 1 and 2, in the illustrated example, therefore, the two lateral sidearms 102 protrude cantilevered from the external lateral sides 104a of the two lens holder rims 104, traditionally called "frontal piece" 104a of the frame, and are connected to the front side 101 of the spectacles frame 100 by way of two connection hinges positioned in correspondence with one of the aforementioned external lateral sides 104a.

In other words, the proximal end of each lateral sidearm 102 is rigidly fixed to the left outer side or "frontal piece" 104a of a corresponding lens holder rim 104 by way of a respective connection hinge 1.

Also the two lateral sidearms 102 are preferably made of plastic material, preferably, but not necessarily, by an injection molding process.

With reference to FIGS. 2, 3, 4 and 5, each connection hinge 1 comprises essentially:
 a cup-shaped body 2, which is provided with a central cavity 3 of substantially cylindrical shape, and is structured so as to be fixed cantilevered in a rigid manner onto the lateral side of the front part 101 of the spectacles frame 100, or better on the left outer side or "frontal piece" 104a of the lens holder rim 104, with the central cavity 3 locally substantially coaxial with the rotation axis A of the sidearm; and
 a central pin 4, which has a cylindrical shape substantially complementary to that of the central cavity 3 of the cup-shaped body 2, and is inserted in axially rotatable manner in the central cavity 3 of the cup-shaped body 2.

In other words, when the cup-shaped body 2 is integral with the lateral side of the front part 101 of the spectacles frame 100, or better to the left outer side or "frontal piece" 104a of the lens holder rim 104, the reference axis C of the central cavity 3 of the cup-shaped body 2 is to coincide with the rotation axis A of the sidearm.

More in detail, in the example shown the cup-shaped body 2 is preferably provided with a protruding tailpiece 2a that is structured so as to be embedded or otherwise fixed in rigid manner to the lateral side of the front part 101 of the spectacles frame 100, or better on the left outer side or "frontal piece" 104a of the lens holder rim 104, simultaneously arranging the central cavity 3 locally substantially coaxial with the rotation axis A of the sidearm.

Figure 4:
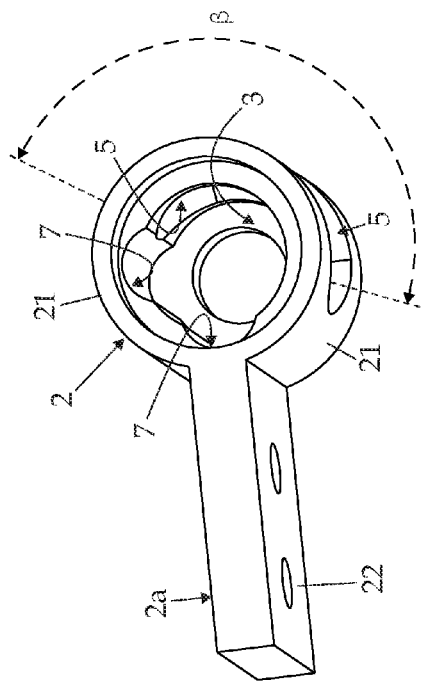

With reference to FIGS. 2 and 4, furthermore the cup-shaped body 2 is provided with a transversal, oblong, pass-through slot or cut 5, which extends along the lateral side of the cup-shaped body 2 while remaining on a lying plane locally substantially perpendicular to the reference axis C of the central cavity 3 of the cup-shaped body 2, and penetrates in the cup-shaped body 2, perpendicularly to the reference axis C, to reach the central cavity 3; and the connection hinge 1 also comprises a transversal oblong, locking plug 6, which has one end 6a rigidly fixed to the body of the central pin 4, and is structured so as to protrude cantilevered from the cup-shaped body 2 engaging in pass-through and sliding manner the pass-through slot or cut 5 present on the lateral side of the cup-shaped body 2, and so as to be rigidly fixed on the proximal end of the lateral sidearm 102.

More in detail, the transversal locking plug 6 is preferably structured so as to be embedded, incorporated or otherwise rigidly fixed on the proximal end of the lateral sidearm 102.

In the example illustrated, in particular, the pass-through slot or cut 5 formed on the lateral side of the cup-shaped body 2, has an opening angle β preferably greater than 90°, and preferably, but not necessarily, comprised between 95° and 115°.

In addition to what written above, with reference to FIGS. 2, 3, 4 and 5, in the example shown the cup-shaped body 2 is preferably also provided with one or more lateral niches or recesses 7 which are made on the lateral surface of the cylindrical central cavity 3, angularly spaced to one another; and the connection hinge 1 is also provided with a bolt lock mechanism 8, which is housed inside the central pin 4, and is structured so as to protrude elastically from the body of the central pin 4 to be able to engage/drive into any one of the niches or recesses 7 present on the lateral cylindrical surface of the central cavity 3, so as to prevent rotation of the pin 4 within the central cavity 3.

More in detail, in the example shown the cup-shaped body 2 is preferably provided with at least two lateral niches or recesses 7, and said lateral niches or recesses 7 are preferably made on the lateral cylindrical surface of the central cavity 3 angularly spaced about the reference axis C by an angle preferably, but not necessarily, equal to approximately 90°.

Figure 3:
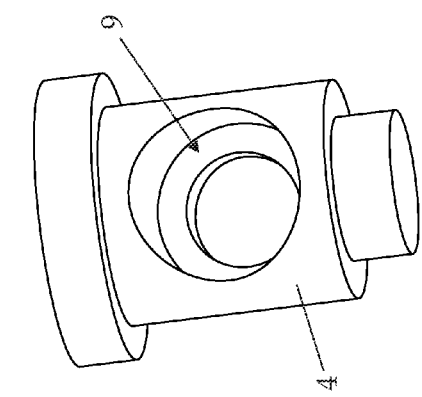
Figure 5:
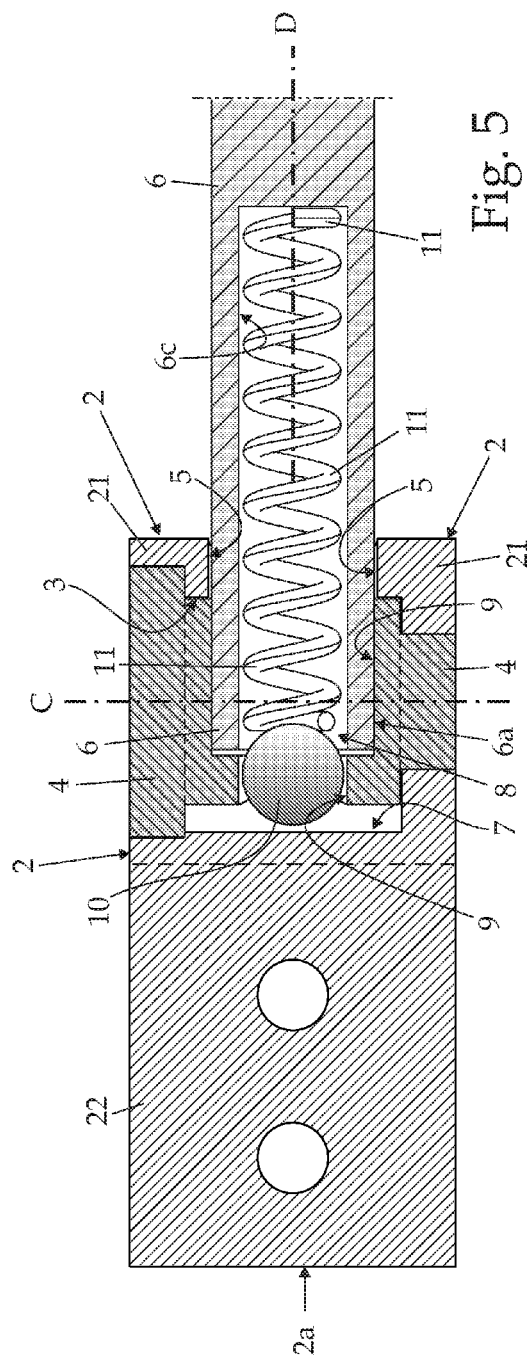
FIG. 5 is a sectional view of the connection hinge illustrated in FIG. 2.

With particular reference to FIGS. 2, 3 and 5, the central pin 4 is instead preferably provided with a diametrical pass-through hole 9 which extends through the body of the central pin 4, while remaining locally substantially perpendicular to the longitudinal axis of the pin, i.e. while remaining locally substantially perpendicular to the axis C of the central cavity 3.

The end 6a of the transversal locking plug 6 is preferably structured so as to be fitted and keyed in a rigid manner inside a first end of the diametrical pass-through hole 9 of the central pin 4; while the bolt lock mechanism 8 is housed inside the diametrical pass-through hole 9 of the central pin 4, and is structured so as to protrude from the body of the central pin 4 through the second end of the same diametrical pass-through hole 9 of the central pin 4.

More in detail, with particular reference to FIGS. 2 and 5, in the illustrated example, the bolt lock mechanism 8 preferably comprises:

a mobile pawl 10 which is placed inside the diametrical pass-through hole 9 of the central pin 4 with the possibility to move axially inside the same hole 9, and is structured so as to protrude outside of the central pin 4 through one of the two ends of the diametrical pass-through hole 9, so as to be engage/drive into any one of the niches or recesses 7 present on the lateral cylindrical surface of the central cavity 3, in order to prevent rotation of the pin 4 inside the central cavity 3; and an elastic element 11 which is interposed between the mobile pawl 10 and the end 6a of the locking plug 6, and is structured so as to elastically push the mobile pawl 10 outside of the central pin 4, through the mouth of the diametrical pass-through hole 9 not occupied by the end 6a of the locking plug 6.

In other words, the end 6a of the transversal locking plug 6 is structured so as to be inserted and keyed in a rigid manner within the diametrical pass-through hole 9 of the central pin 4, close to the mobile pawl 10; while the remaining part of the transversal locking plug 6 is structured so as to protrude cantilevered from the cup-shaped body 2 engaging in pass-through and sliding manner the pass-through slot or cut 5 present on the lateral side of the cup-shaped body 2, and so to be embedded, incorporated or otherwise rigidly fixed on the proximal end side of the sidearm 102.

In the example illustrated, in particular, the cup-shaped body 2 and/or the central pin 4 and/or the locking plug 6 and/or the mobile pawl 10 and/or the elastic element 11 is/are preferably made of a metal material.

With reference to FIGS. 2, 3, 4 and 5, in the illustrated example, moreover, the cup-shaped body 2 is preferably formed of a cylindrical bushing 21, which extends coaxial to the reference axis C and is provided with a central circular-section pass-through hole which is divided into three consecutive segments with nominal diameter decreasing relative to one another; and a plate-shaped winglet 22 which cantilevered protrudes from the cylindrical bushing 21 in a substantially radial and locally substantially coplanar direction to the reference axis C of the cylindrical bushing 21, and is structured so as to be embedded and/or otherwise rigidly fixed onto the lateral side of the front part 101 of the spectacles frame 100, or better, on the left outer side or "frontal piece" 104a of the lens holder rim 104, simultaneously arranging the central cavity 3 coaxial with the rotation axis A of the sidearm.

The cylindrical bushing 21 is also provided with an oblong, pass-through slot or cut, which extends along the lateral side of the cylindrical bushing 21 while remaining on a lying plane locally substantially perpendicular to the reference axis C of the bushing, and penetrates inside the body of the bushing 21 orthogonally to the reference axis C until reaching the central portion of the central pass-through hole of the cylindrical bushing 21; and preferably also with two lateral niches or recesses that are formed on the lateral cylindrical surface of the central portion of the central circular-section pass-through hole of the cylindrical bushing 21.

Preferably, the cylindrical bushing 21 is finally made of metal material and in one piece with the plate-shaped winglet preferably, but not necessarily, by means of a metal material injection molding process traditionally called MIM (acronym of Metal Injection Molding).

In other words, the cup-shaped body 2 is preferably made of metal material by means of a metal material injection molding process, traditionally called MIM (acronym of Metal Injection Molding).

The central pin 4 is instead preferably formed by a cylindrical body 4 made of metal material, having a shape complementary to that of the central pass-through hole of the cylindrical bushing 21, so as to be simply fitted inside the central pass-through hole of the cylindrical bushing 21 through the port with a larger diameter; and is provided with a circular, diametrical pass-through hole, which crosses the central segment of the cylindrical body 4 from one side to the other while remaining locally substantially perpendicular to the longitudinal axis of the cylindrical body 4, which is locally substantially perpendicular to the reference axis C.

Preferably, the diametrical pass-through hole of the cylindrical body 4 is also divided into two consecutive segments with decreasing nominal diameter, and the end 6a of the locking plug 6 is adapted to engage the portion of the diametrical pass-through hole with larger diameter.

Preferably, the cylindrical body 4, i.e. the central pin 4, is finally obtained by a method of injection molding of metal material, traditionally called MIM (acronym of Metal Injection Molding).

With reference to FIGS. 2 and 5, in the illustrated example, moreover, the mobile pawl 10 is preferably constituted by a ball 10 of metal material, which has a diameter approximated by defect to the diameter of the segment of the diametrical pass-through hole 9 of the cylindrical body 4 not engaged by the locking plug 6.

The transversal locking plug 6 is instead preferably constituted by a circular, straight rod or shank 6 made of metal material, which extends coaxially to a longitudinal axis D which appears to be locally substantially perpendicular to the reference axis C of the cup-shaped body 2, and has the ends 6a provided with thread so as to be screwed inside the portion with larger diameter of the diametrical pass-through hole 9 of the cylindrical body 4.

The elastic element 11 is finally preferably, but not necessarily, constituted by a helical spring 11 made of metal material, which is positioned at least partially within the diametrical pass-through hole 9 of the cylindrical body 4, with a first end in abutment on the mobile pawl 10, or better on the ball 10, and with a second end in abutment on the body of the locking plug 6, so as to push in an elastic manner the mobile pawl 10, namely the ball 10, outside of the central pin 4 and in abutment against the lateral cylindrical surface of the central cavity 3, through the port of the diametrical pass-through hole 9 not occupied by the shank 6.

More in detail, with reference to FIGS. 2 and 5, in the illustrated example the end 6a of the shank 6 is preferably provided with a cylindrical blind hole 6c, which extends inside the body of the shank 6 coaxial with the longitudinal axis D; and the helical spring 11 is at least partially housed within the cylindrical blind hole 6c, with the second end in abutment on the bottom of the cylindrical blind hole 6c.

The operation of the connection hinge 1 is easily deducible from the foregoing description, and does not require further explanation; if not to state that the transversal locking plug 6, when inserted and locked inside the diametrical hole 9 of the central pin 4, prevents the extraction of the central pin 4 from the cup-shaped body 2, but allows the central pin 4 to rotate freely with respect to the cup-shaped body 2 to a maximum amplitude corresponding to the opening angle β of the pass-through slot or cut 5 formed on the lateral side of the cup-shaped body 2.

The advantages deriving from the particular connection structure 1 are numerous.

In the first place, during normal operation of the hinge, the locking plug 6 is no longer subject to torques that can cause the unscrewing of the plug 6 from the central pin 4, thus eliminating any need for periodic tightening of the components.

Furthermore, the locking plug 6 can be obtained directly on the distal end of the lateral sidearm 102, greatly simplifying the assembly operations of the spectacles frame 100.

Finally it is clear that the connection hinge 1 and the spectacles frame 100 described above can be modified and varied without departing from the scope of the present invention.

For example, instead of being provided with threading, the end 6a of the rod or shank 6, namely the end of the locking plug 6, may be structured so as to be keyed by force, welded or glued to the body of the central pin 4 at the mouth of the diametrical hole 9, if present, so as to prevent the disassembly of the connection hinge 1.

The invention claimed is:

1. Connection hinge (1) for spectacles frames (100) of the type designed to connect the lateral sidearm (102) of a spectacles frame (100) to the front part (101) of the same spectacles frame (100); the connection hinge (1) comprising:
    a cup-shaped body (2) which is structured so as to be fixed cantilevered and in rigid manner onto the lateral side of the front part (101) of a spectacles frame (100), and is provided with a substantially cylindrical-shaped central cavity (3) and with a transversal, oblong, pass-through slot or cut (5) which extends along the lateral side of the cup-shaped body (2) while remaining on a lying plane locally substantially perpendicular to the reference axis (C) of the central cavity (3), and penetrates in the cup-shaped body (2) to reach said central cavity (3);
    a central pin (4), which has a cylindrical shape substantially complementary to that of the central cavity (3) of the cup-shaped body (2), and is inserted in axially rotatable manner in the central cavity (3) of the cup-shaped body (2); and
    a transversal locking plug (6) which has an end (6a) rigidly fixed to the body of the central pin (4), and is structured so as to cantilevered protrude from the cup-shaped body (2) engaging in pass-through and sliding manner the pass-through slot or cut (5) present on the lateral side of the cup-shaped body (2), and so as to be rigidly fixed to or incorporated on the proximal end of the lateral sidearm (102) of the spectacles; wherein the cup-shaped body (2) is additionally provided with one or more lateral niches or recesses (7) which are realized on the lateral cylindrical surface of the central cavity (3), angularly spaced to one another; and the hinge additionally comprises bolt lock means (8) which are located inside the central pin (4) and are structured so as to protrude elastically from the body of the central pin (4) to engage/drive into any one of the lateral niches or recesses (7) present on the cylindrical lateral surface of the central cavity (3), so as to be able to prevent rotation of the pin (4) in the central cavity (3).

2. Connection hinge according to claim 1, characterized in that the cup-shaped body (2) is provided with at least two lateral niches or recesses (7) which are realized on the lateral cylindrical surface of the central cavity (3) angularly spaced about the reference axis (C) of the central cavity (3) by an angle equal to approximately 90°.

3. Connection hinge according to claim 1, characterized in that the central pin (4) is provided with a diametrical hole (9) which extends through the body of the central pin (4), remaining locally substantially perpendicular to the reference axis (C) of the central cavity (3), and in that the end (6a) of the transversal locking plug (6) is structured so as to be inserted and rigidly blocked in said diametrical hole (9).

4. Connection hinge according to claim 3, characterized in that the diametrical hole (9) of the central pin (4) is a diametrical pass-through hole (9); in that the end (6a) of the transversal locking plug (6) is structured so as to be inserted and rigidly blocked in a first end of the diametrical pass-through hole (9) of the central pin (4); and in that the bolt locking means (8) are located in the diametrical pass-through hole (9) of the central pin (4), and are structured so as to protrude from the body of the central pin (4) through the second end of said diametrical pass-through hole (9).

5. Connection hinge according to claim 4, characterized in that the bolt locking means (8) comprise:
    a mobile pawl (10) which is located in the diametrical pass-through hole (9) of the central pin (4) with the possibility of axially moving in the same hole (9), and is structured so as to be able to protrude outside the central pin (4) through one of the two ends of the diametrical pass-through hole (9), so as to be able to engage/drive into any one of the lateral niches or recesses (7) present on the cylindrical lateral surface on the central cavity (3); and
    an elastic element (11) which is interposed between the mobile pawl (10) and the end (6a) of the transversal locking pin (6), and is structured so as to push the mobile pawl (10) in elastic manner outside the central pin (4), through the mouth of the diametrical pass-through hole (9) not occupied by the ends (6a) of the transversal locking plug (6).

6. Connection hinge according to claim 1, characterized in that the pass-through slot or cut (5) made on the lateral side of the cup-shaped body (2) has an angular opening (β) greater than 90°.

7. Connection hinge according to claim 1, characterized in that the cup-shaped body (2) is provided with a protruding tailpiece (2a) which is structured so as to be incorporated or otherwise fixed in rigid manner to the lateral side of the front part (101) of the spectacles frame (100).

8. Connection hinge according to claim 7, characterized in that the cup-shaped body (2) comprises a cylindrical bushing (21) which is provided with a central circular-section pass-through hole (3), and a plate-shaped winglet (22) which cantilevered protrudes from the cylindrical bushing (21) in a direction substantially radial and locally substantially coplanar to a reference axis (C) of the cylindrical bushing (21), and is structured so as to be embedded and/or otherwise rigidly fixed onto the lateral side of the front part (101) of the spectacles frame (100).

9. Connection hinge according to claim 8, characterized in that the central pass-through hole (3) of the cylindrical bushing (21) is divided into three consecutive segments with nominal diameter decreasing to one another.

10. Connection hinge according to claim 8, characterized in that the cylindrical bushing (21) is made of metal material and in one piece with the plate-shaped winglet (22).

11. Connection hinge according to claim 1, characterized in that the cup-shaped body (2) is made of metal material by means of a metal material injection molding process.

12. Connection hinge according to claim 9, characterized in that the central pin (4) comprises a cylindrical body (4) having a shape complementary to that of the central pass-through hole (3) of the cylindrical bushing (21), so as to be inserted in the central pass-through hole (3) of the bushing (21) through an open upper portion of the cylindrical body (4) that is defined by a maximum diameter of the central pass-through hole (3), and is provided with a circular-section, diametrical pass-through hole (9) which crosses the central segment of the cylindrical body (4) from side to side while remaining locally substantially perpendicular to the longitudinal axis (C) of the cylindrical body (4).

13. Connection hinge according to claim 1, characterized in that the central pin (4) is made of metal material by means of a metal material injection molding process.

14. Spectacles frame (100) comprising a front part (101) which is structured so as to be able to directly accommodate/support the lenses, and is designed to be arranged straddling the nose, at the height of the eyes; and two lateral sidearms (102) which are hinged to the front part (101) of the spectacles frame, on opposite sides of the same front part; the spectacles frame (100) being characterized in that at least one of the two lateral sidearms (102) is fixed to the front part (101) of the spectacles frame by means of a connection hinge (1) as defined in claim 1.

15. Connection hinge (1) for spectacles frames (100) of the type designed to connect the lateral sidearm (102) of a spectacles frame (100) to the front part (101) of the same spectacles frame (100); the connection hinge (1) being characterized by comprising:
- a cup-shaped body (2) which is structured so as to be fixed cantilevered and in rigid manner onto the lateral side of the front part (101) of a spectacles frame (100), and is provided with a substantially cylindrical-shaped central cavity (3) and with a transversal, oblong, pass-through slot or cut (5) which extends along the lateral side of the cup-shaped body (2) while remaining on a lying plane locally substantially perpendicular to the reference axis (C) of the central cavity (3), and penetrates in the cup-shaped body (2) to reach said central cavity (3);
- a central pin (4), which has a cylindrical shape substantially complementary to that of the central cavity (3) of the cup-shaped body (2), and is inserted in axially rotatable manner in the central cavity (3) of the cup-shaped body (2);
- a transversal locking plug (6) which has an end (6a) rigidly fixed to the body of the central pin (4), and is structured so as to cantilevered protrude from the cup-shaped body (2) engaging in pass-through and sliding manner the pass-through slot or cut (5) present on the lateral side of the cup-shaped body (2), and so as to be rigidly fixed to or incorporated on the proximal end of the lateral sidearm (102) of the spectacles; wherein the cup-shaped body (2) is additionally provided with one or more lateral niches or recesses (7) which are realized on the lateral cylindrical surface of the central cavity (3), angularly spaced to one another; and
- a bolt lock means (8) which are located inside the central pin (4) and are structured so as to protrude elastically from the body of the central pin (4) to engage/drive into any one of the lateral niches or recesses (7) present on the cylindrical lateral surface of the central cavity (3), so as to be able to prevent rotation of the pin (4) in the central cavity (3), wherein the bolt lock means (8) is biasedly disposed between the end (6a) of the transversal locking plug (6) and the body of the central pin (4).

* * * * *